United States Patent
Kumakura et al.

(10) Patent No.: US 11,143,446 B2
(45) Date of Patent: Oct. 12, 2021

(54) REFRIGERATION DEVICE CONTROLLING A TEMPERATURE OF COMPRESSOR-DISCHARGED REFRIGERANT

(71) Applicant: DAIKIN INDUSTRIES, LTD., Osaka (JP)

(72) Inventors: Eiji Kumakura, Osaka (JP); Kazuhiro Furusho, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 121 days.

(21) Appl. No.: 16/524,899

(22) Filed: Jul. 29, 2019

(65) Prior Publication Data

US 2019/0346192 A1 Nov. 14, 2019

Related U.S. Application Data

(63) Continuation of application No. PCT/JP2018/001219, filed on Jan. 17, 2018.

(30) Foreign Application Priority Data

Jan. 30, 2017 (JP) .............................. JP2017-014112

(51) Int. Cl.
*F25B 49/02* (2006.01)

(52) U.S. Cl.
CPC .......... *F25B 49/022* (2013.01); *F25B 49/025* (2013.01); *F25B 2500/08* (2013.01);
(Continued)

(58) Field of Classification Search
CPC .. F25B 49/022; F25B 49/025; F25B 2500/08; F25B 2600/025; F25B 2700/21152; F25B 2700/21157
See application file for complete search history.

(56) References Cited

U.S. PATENT DOCUMENTS

| | | | | |
|---|---|---|---|---|
| 5,076,067 A | * | 12/1991 | Prenger | ................... F04C 28/28 62/197 |
| 2008/0078191 A1 | | 4/2008 | Morishita et al. | |

(Continued)

FOREIGN PATENT DOCUMENTS

| | | |
|---|---|---|
| CN | 101153600 A | 4/2008 |
| CN | 106103992 A | 11/2016 |

(Continued)

OTHER PUBLICATIONS

JP 2008-277562 (English translation) (Year: 2008).*

(Continued)

*Primary Examiner* — Jonathan Bradford
(74) *Attorney, Agent, or Firm* — Birch, Stewart, Kolasch & Birch, LLP (57) ABSTRACT

As a refrigerant, a refrigerant containing a fluorocarbon having a property of causing a disproportionation reaction is used. A refrigeration apparatus includes: a refrigerant temperature detector configured to detect a discharged refrigerant temperature which is a temperature of the refrigerant that is being discharged from the compression mechanism or immediately after the discharge; and a controller configured to control the discharged refrigerant temperature detected by the refrigerant temperature detector such that the discharged refrigerant temperature is equal to or lower than a predetermined temperature Ts.

10 Claims, 7 Drawing Sheets

(52) U.S. Cl.
CPC ............ *F25B 2600/025* (2013.01); *F25B 2700/21152* (2013.01); *F25B 2700/21157* (2013.01)

(56) References Cited

U.S. PATENT DOCUMENTS

| | | | |
|---|---|---|---|
| 2009/0094997 A1* | 4/2009 | McSweeney | G05B 13/024 62/126 |
| 2014/0070132 A1 | 3/2014 | Fukushima | |
| 2014/0314606 A1 | 10/2014 | Maeyama et al. | |
| 2014/0314607 A1 | 10/2014 | Maeyama et al. | |
| 2017/0003060 A1 | 1/2017 | Tanaka et al. | |
| 2017/0146265 A1 | 5/2017 | Fujitaka et al. | |

FOREIGN PATENT DOCUMENTS

| | | |
|---|---|---|
| CN | 106164604 A | 11/2016 |
| EP | 3 121 533 A1 | 1/2017 |
| EP | 3 121 534 A1 | 1/2017 |
| JP | 5-44679 A | 2/1993 |
| JP | 8-40053 A | 2/1996 |
| JP | 10-153353 A | 6/1998 |
| JP | 2008-277562 A | 11/2008 |
| JP | 2014-211092 A | 11/2014 |
| JP | 2014-211093 A | 11/2014 |
| JP | 2015-7257 A | 1/2015 |
| JP | 2015-218909 A | 12/2015 |
| JP | 2015-232319 A | 12/2015 |
| WO | WO 2015/140876 A1 | 9/2015 |

OTHER PUBLICATIONS

International Search Report, issued in PCT/JP2018/001219, PCT/ISA/210, dated Apr. 3, 2018.
Written Opinion of the International Searching Authority, issued in PCT/JP2018/001219, PCT/ISA/237, dated Apr. 3, 2018.
Extended European Search Report dated Oct. 30, 2020 in corresponding European Application No. 18744521.8.

* cited by examiner

REFRIGERATION DEVICE CONTROLLING A TEMPERATURE OF COMPRESSOR-DISCHARGED REFRIGERANT

CROSS-REFERENCE TO RELATED APPLICATIONS

This is a continuation of International Application No. PCT/JP2018/1219 filed on Jan. 17, 2018, which claims priority to Japanese Patent Application No. 2017-014112 filed on Jan. 30, 2017. The entire disclosures of these applications are incorporated by reference herein.

BACKGROUND ART

The present disclosure relates to a refrigeration apparatus for performing a refrigeration cycle.

A refrigeration apparatus having a refrigerant circuit to which a compressor is connected and in which a refrigerating cycle is performed has been known. Such a refrigeration apparatus is widely used in an air conditioner and other devices.

Japanese Unexamined Patent Publication No. 2015-7257 discloses a refrigerant in which 1,1,2-trifluoroethylene (HFO-1123) is used as a refrigerant to be filled in a refrigerant circuit. This refrigerant is easily decomposed by OH radicals in the atmosphere, so that the influence on the ozone layer and the influence on global warming are small, and the cycle performance is excellent.

SUMMARY

Fluorocarbon such as the HFO-1123 described above has a tendency to cause a disproportionation reaction. Here, the disproportionation reaction is a chemical reaction in which molecules of the same kind react with each other to provide different products.

When a refrigeration cycle is performed using a refrigerant having such a property that tends to cause the disproportionation reaction, the temperature of the high-pressure refrigerant compressed by the compressor becomes higher than a predetermined temperature, so that the disproportionation reaction may occur.

On the other hand, as a technique for reducing a temperature rise in a high-pressure refrigerant, there is a method in which a temperature sensor is provided in a discharge pipe connected to a compressor, and the temperature of the refrigerant flowing in the discharge pipe is controlled to be equal to or lower than a predetermined temperature. However, since the discharge pipe is installed in the outside or other sites, the refrigerant flowing through the discharge pipe easily dissipates heat to the air around the discharge pipe. Therefore, the refrigerant flowing through the discharge pipe tends to be somewhat lower in temperature than the temperature of the refrigerant discharged from a compression mechanism. Therefore, even if the temperature of the refrigerant flowing through the discharge pipe is controlled to be equal to or lower than the predetermined temperature Ts at which the disproportionation reaction may occur, the temperature of the refrigerant discharged from the compression mechanism may exceed the predetermined temperature Ts, and this refrigerant may undergo a disproportionation reaction.

The present disclosure attempts to provide a refrigeration apparatus capable of substantially preventing a disproportionation reaction of a high-pressure refrigerant in a refrigerant circuit with reliability.

A first aspect of the present disclosure is directed to a refrigeration apparatus comprising a refrigerant circuit (11) to which a compressor (30) for compressing a refrigerant is connected. The refrigerant contains a fluorocarbon having a property of causing a disproportionation reaction. The compressor (30) includes: a casing (31); an electric motor (32) housed in the casing (31); a compression mechanism (40) driven by the electric motor (32) and configured to discharge the refrigerant, which has been compressed, into an internal space (S) of the casing (31); and a discharge pipe (22) configured to send the refrigerant in the internal space (S) to the refrigerant circuit (11). The refrigeration apparatus includes: a refrigerant temperature detection unit (61, 62, 91) for detecting a discharged refrigerant temperature which is a temperature of the refrigerant that is being discharged from the compression mechanism (40) or immediately after the discharge; and a control unit (93) configured to control the discharged refrigerant temperature detected by the refrigerant temperature detection unit (61, 62, 91) such that the discharged refrigerant temperature is equal to or lower than a predetermined temperature Ts.

In the compressor (30) of the first aspect of the present disclosure, when the refrigerant is compressed by the compression mechanism (40), the compressed refrigerant is discharged from the compression mechanism (40) to the internal space (S). The refrigerant which has flowed into the internal space (S) flows through the discharge pipe (22), and then, is used for the refrigeration cycle of the refrigerant circuit (11).

The refrigerant temperature detection unit (61, 62, 91) of the present disclosure detects the temperature of the refrigerant that is being discharged from the compression mechanism (40) or immediately after the discharge from the compression mechanism (40) (the discharged refrigerant temperature), not the temperature of the refrigerant in the discharge pipe (22). The term "detecting a temperature" means not only directly measuring a temperature by, e.g., a sensor, but also estimating the temperature based on a certain parameter.

Here, the discharged refrigerant temperature tends to be higher than the temperature of the refrigerant flowing through the discharge pipe and significantly influenced through heat dissipation to the surroundings. Therefore, the control unit (93) controls the discharged refrigerant temperature such that the temperature is equal to or lower than the predetermined temperature Ts, thereby reliably reducing the temperature of the high pressure refrigerant to a temperature lower than or equal to the temperature at which the disproportionation reaction occurs.

A second aspect of the present disclosure is an embodiment of the first aspect. In the second aspect, the refrigerant temperature detection unit is a refrigerant temperature estimation unit (91) configured to estimate the discharged refrigerant temperature based on an operating state of the refrigerant circuit (11).

In the second aspect of the present disclosure, the refrigerant temperature estimation unit (91) estimates the discharged refrigerant temperature based on the operating state of the refrigerant circuit (11). Therefore, the discharged refrigerant temperature can be controlled to be equal to or lower than the predetermined temperature Ts without disposing a sensor or the like in the compressor (30).

A third aspect of the present disclosure is an embodiment of the first aspect. In the third aspect, the refrigerant temperature detection unit is a discharge-port-side temperature sensor (61) provided in a discharge port (47) of the compression mechanism (40).

In the third aspect of the present disclosure, the discharge-port-side temperature sensor (61), which is a refrigerant temperature detection unit, is provided in the discharge port (47). The discharge-port-side temperature sensor (61) detects the temperature of the refrigerant flowing through the discharge port (47). This configuration makes it possible to directly determine the temperature of the refrigerant that is being discharged from the compression mechanism (40).

A fourth aspect of the present disclosure is an embodiment of any one of the first to third aspects of the invention. In the fourth aspect, the refrigerant apparatus includes a muffler (48) through which the refrigerant immediately after the discharge from the compression mechanism (40) passes, wherein the refrigerant temperature detection unit is a muffler-side temperature sensor (62) provided inside the muffler (48).

In the fourth aspect of the invention, the refrigerant immediately after the discharge from the compression mechanism (40) flows inside the muffler (48). This can reduce noise of the refrigerant that is being discharged from the compression mechanism (40). A muffler-side temperature sensor (62), which is a refrigerant temperature detection unit, is provided inside the muffler (48). That is, the noise reduction space of the muffler (48) is used as a space for installing the muffler-side temperature sensor (62). The muffler-side temperature sensor (62) detects the temperature of the refrigerant inside the muffler (48). This configuration makes it possible to directly determine the temperature of the refrigerant immediately after the discharge from the compression mechanism (40).

A fifth aspect of the present disclosure is an embodiment of any one of the first to fourth aspects of the invention. In the fifth aspect, the electric motor (32) is disposed in the internal space (S) of the casing (31). The refrigeration apparatus includes a coil temperature detection unit (70, 92) configured to detect a coil temperature of the electric motor (32). The control unit (93) controls the discharged refrigerant temperature such that the discharged refrigerant temperature is equal to or lower than the predetermined temperature Ts if the discharged refrigerant temperature is higher than the coil temperature, and controls the coil temperature such that the coil temperature is equal to or lower than the predetermined temperature Ts if the coil temperature is higher than the discharged refrigerant temperature.

In the fifth aspect of the invention, the electric motor (32) is disposed in the internal space (S) of the casing (31). Therefore, the refrigerant discharged from the compression mechanism (40) may receive heat from the coil (33a) of the electric motor (32), and the temperature of the refrigerant may increase. Therefore, in the present disclosure, the coil temperature detection unit (70, 92) detects the coil temperature of the electric motor (32).

Under a condition where the discharged refrigerant temperature detected by the refrigerant temperature detection unit (61, 62, 91) is higher than the coil temperature detected by the coil temperature detection unit (70, 92), the refrigerant discharged from the compression mechanism (40) does not receive heat from the coil (33a). Therefore, when this condition is satisfied, the control unit (93) controls the discharged refrigerant temperature to be equal to or lower than the predetermined temperature Ts. This can reliably reduce the temperature of the high-pressure refrigerant to a temperature lower than or equal to the temperature at which the disproportionation reaction occurs.

Under a condition where the coil temperature detected by the coil temperature detection unit (70, 92) is higher than the discharged refrigerant temperature detected by the refrigerant temperature detection unit (61, 62, 91), the refrigerant discharged from the compression mechanism (40) may receive heat from the coil (33a). Therefore, when this condition is satisfied, the control unit (93) controls the coil temperature to be equal to or lower than the predetermined temperature Ts. This can reliably reduce the temperature of the high-pressure refrigerant to a temperature lower than or equal to the temperature at which the disproportionation reaction occurs.

A sixth aspect of the present disclosure is an embodiment of any one of the first to fifth aspects of the invention. In the sixth aspect, the refrigerant is a refrigerant containing HFO-1123.

In the sixth aspect of the present disclosure, the refrigerant containing HFO-1123 is used as a refrigerant. HFO-1123 is easily decomposed by the OH radicals in the atmosphere, so that the influence on the ozone layer and the influence on global warming are also small. Further, use of the refrigerant including HFO-1123 also improves the performance of the refrigerating cycle of the refrigeration apparatus.

According to the present disclosure, the temperature of the refrigerant that is being discharged from the compression mechanism (40) or immediately after the discharge is controlled to be lower than or equal to a predetermined temperature. Therefore, it is possible to substantially prevent the temperature of the refrigerant discharged from the compression mechanism (40) from exceeding the temperature at which the disproportionation reaction occurs, more reliably compared to the control using a discharge pipe temperature. This can substantially prevent the high-pressure refrigerant from undergoing a disproportionation reaction with reliability.

In particular, in the fifth aspect of the present disclosure, it is possible to substantially prevent the high-pressure refrigerant from undergoing a disproportionation reaction due to heat input from the coil (33a) of the electric motor (32).

DETAILED DESCRIPTION

Embodiments of the present disclosure will now be described in detail with reference to the drawings. The embodiments below are merely exemplary ones in nature, and are not intended to limit the scope, applications, or use of the present disclosure.

<General Configuration of Refrigeration Apparatus>

Figure 1:
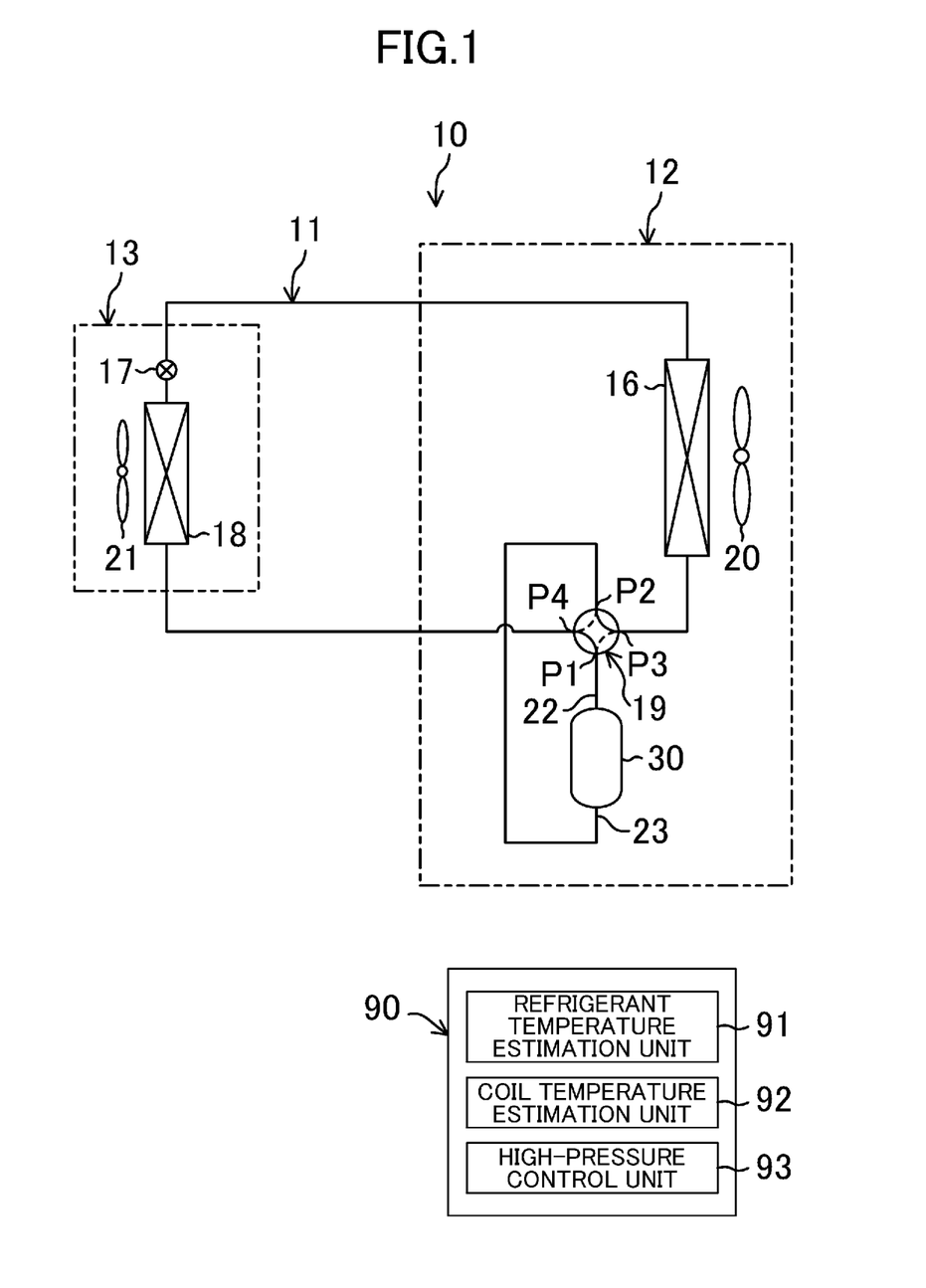
FIG. 1 is a schematic diagram illustrating a refrigeration apparatus according to an embodiment.

The refrigeration apparatus according to the embodiment is an air conditioner (10) for cooling and heating a room. As shown in FIG. 1, the air conditioner (10) includes a refrigerant circuit (11) filled with a refrigerant. In the refrigerant circuit (11), the refrigerant circulates to perform a vapor compression refrigeration cycle. As the refrigerant, a refrigerant containing fluorocarbon having a property of causing a disproportionation reaction is used (details will be described later).

The air conditioner (10) includes an outdoor unit (12) and an indoor unit (13). The indoor unit (13) is not limited to one unit, and may be two or more indoor units.

A compressor (30), an outdoor heat exchanger (16) (heat source heat exchanger), an expansion valve (17), an indoor heat exchanger (18) (utilization heat exchanger), and a four-way switching valve (19) are connected to the refrigerant circuit (11). The compressor (30), the outdoor heat exchanger (16), and the four-way switching valve (19) are accommodated in the outdoor unit (12). The indoor heat exchanger (18) and the expansion valve (17) are accommodated in the indoor unit (13).

In the outdoor unit (12), an outdoor fan (20) is installed near the outdoor heat exchanger (16). The outdoor heat exchanger (16) exchanges heat between the outdoor air transferred by the outdoor fan (20) and the refrigerant. In the indoor unit (13), an indoor fan (21) is installed near the indoor heat exchanger (18). The indoor heat exchanger (18) exchanges heat between the indoor air transferred by the indoor fan (21) and a refrigerant.

The four-way switching valve (19) has first to fourth ports (P1 to P4). The first port (P1) is connected to a discharge pipe (22) of the compressor (30). The second port (P2) is connected to a suction pipe (23) of the compressor (30). The third port (P3) is connected to the gas end portion of the outdoor heat exchanger (16). The fourth port (P4) is connected to the gas end portion of the indoor heat exchanger (18). The four-way switching valve (19) switches between a first state (a state indicated by a solid line in FIG. 1) and a second state (a state indicated by a broken line in FIG. 1). In the first state, the first port (P1) and the fourth port (P4) communicate with each other, and the second port (P2) and the third port (P3) communicate with each other. Accordingly, when the compressor (30) is operated in a situation where the four-way switching valve (19) is in the first state, a refrigeration cycle (heating cycle) in which the indoor heat exchanger (18) serves as a condenser (radiator) and the outdoor heat exchanger (16) serves as an evaporator is performed. In the second state, the first port (P1) and the third port (P3) communicate with each other, and the second port (P2) and the fourth port (P4) communicate with each other. Accordingly, when the compressor (30) is operated in a situation where the four-way switching valve (19) is in the second state, a refrigeration cycle (cooling cycle) in which the outdoor heat exchanger (16) serves as a condenser (radiator), and the indoor heat exchanger (18) serves as an evaporator is performed.

<General Configuration for Compressor>

Figure 2:
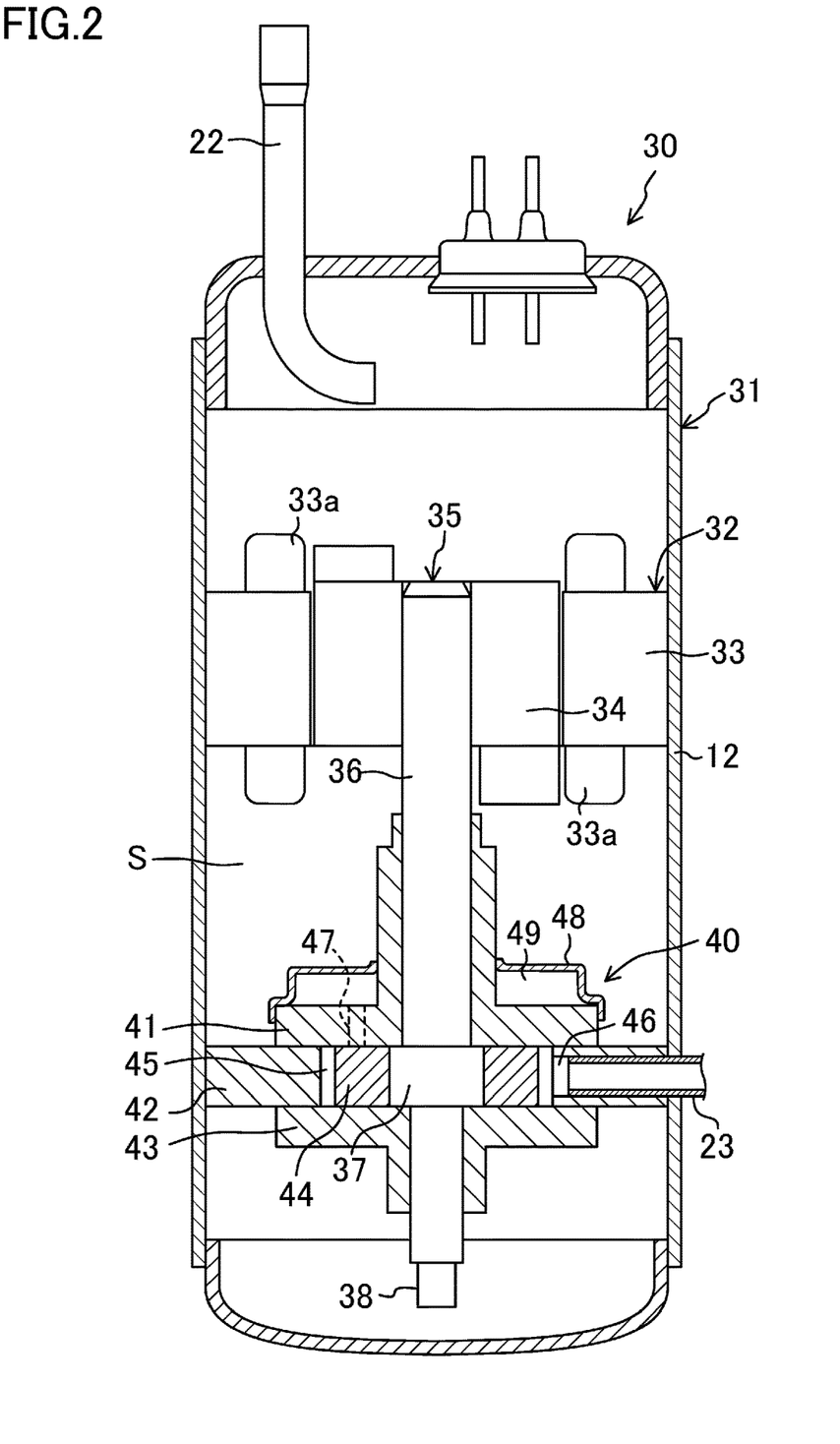
FIG. 2 is a vertical cross-sectional view of a compressor according to the embodiment.

As shown in FIG. 2, the compressor (30) is provided with a vertically elongated, cylindrical sealed casing (31). A suction pipe (23) passes through, and is fixed to, a lower portion of the casing (31). A discharge pipe (22) passes through, and is fixed to, the top (upper end plate) of the casing (31). Oil (refrigerating machine oil) for lubricating sliding portions of the compressor (30) is stored in the bottom of the casing (31). An internal space (S) filled with the refrigerant (a discharged refrigerant or high-pressure refrigerant) discharged from a compression mechanism (40) is formed in the casing (31). That is to say, the compressor (30) of this embodiment is a so-called high-pressure dome-shaped compressor in which the internal pressure of the internal space (S) of the casing (31) is substantially equal to the pressure of the high-pressure refrigerant.

In the interior space (S) of the casing (31), an electric motor (32), a drive shaft (35), and the compression mechanism (40) are disposed in this order from the top to the bottom.

The electric motor (32) includes a stator (33) and a rotor (34). The stator (33) is fixed to an inner circumferential surface of a body of the casing (31). The rotor (34) vertically passes through the inside of the stator (33). The stator (33) has a coil (33a) wound around its tooth portion (not shown). A drive shaft (35) is fixed to the inside of the axial center of the rotor (34). When the electric motor (32) is energized, the drive shaft (35) is driven to rotate together with the rotor (34).

The drive shaft (35) is located on the axial center of the body of the casing (31). The drive shaft (35) is rotatably supported by each bearing of the compression mechanism (40). The drive shaft (35) has a main shaft (36) coaxial with the electric motor (32) and a crank shaft (37) eccentric from the main shaft (36). The outer diameter of the crank shaft (37) is larger than that of the main shaft (36). The lower portion of the drive shaft (35) is provided with an oil pump (38) for pumping up oil stored in the bottom of the casing (31). The oil pumped up by the oil pump (38) is supplied to the bearing and each sliding portion of the compression mechanism (40) via a flow path (not shown) inside the drive shaft (35).

The compression mechanism (40) is disposed below the electric motor (32). The compression mechanism (40) includes a front head (41), a cylinder (42), a rear head (43), and a piston (44). The cylinder (42) is formed in a flat cylindrical shape. The cylinder (42) has its upper end closed by the front head (41), and its lower end closed by the rear head (43). As a result, a cylindrical cylinder chamber (45) is defined in the cylinder (42).

An annular piston (44) is accommodated in the cylinder chamber (45). The crank shaft (37) fits into the piston (44). Therefore, when the drive shaft (35) is driven to rotate by the electric motor (32), the piston (44) is eccentrically rotated in the cylinder chamber (45).

A suction port (46) communicating with the cylinder chamber (45) (specifically, a low-pressure chamber (L)) passes through the cylinder (42) in the radial direction. The suction pipe (23) is connected to the suction port (46). A discharge port (47) communicating with the cylinder chamber (45) (specifically, a high-pressure chamber (H)) is formed in the front head (41). A discharge valve (not shown) such as a reed valve is provided in the discharge port (47).

A muffler (48) for covering the front head (41) is attached to the top of the compression mechanism (40). A muffler space (49) communicating with the discharge port (47) is formed in the muffler (48). In the muffler space (49), noise caused by discharge pulsation of the refrigerant is reduced.

The air conditioner (10) is provided with a controller (90) for controlling the respective components. The controller (90) will be described in detail later.

<Internal Configuration for Compression Mechanism>

Figure 3:
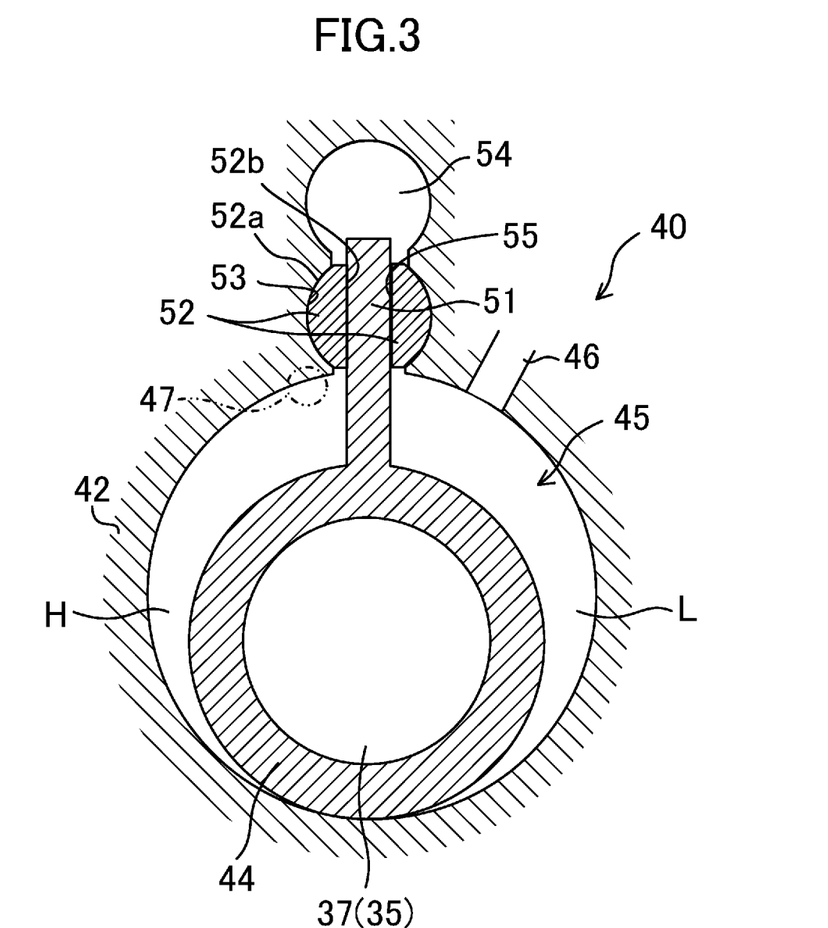
FIG. 3 is a horizontal cross-sectional view illustrating the interior of a compression mechanism according to the embodiment.

The compression mechanism (40) is an oscillating piston compressor having a blade (51) and a pair of bushes (52). As shown in FIGS. 2 and 3, a bush groove (53) and a back pressure chamber (54) are formed in the cylinder (42). The bush groove (53) is formed adjacent to the cylinder chamber (45), and communicates with the cylinder chamber (45). The bush groove (53) defines a cylindrical space having a substantially circular horizontal cross section. The back pressure chamber (54) is located outward of the bush groove (53) in the radial direction in the cylinder (42). The back pressure chamber (54) constitutes a cylindrical space having a substantially circular horizontal cross section.

The back pressure chamber (54) has an end, closer to the cylinder chamber (45), communicating with the bush groove (53). The back pressure chamber (54) is in an atmosphere having a high pressure corresponding to the pressure in the internal space (S) of the casing (31) (i.e., the pressure of the refrigerant discharged from the compression mechanism (40)). The oil pumped up by the oil pump (38) is supplied to the back pressure chamber (54). The oil in the back pressure chamber (54) is used for lubricating a sliding portion between the inner circumferential surface of the bush groove (53) and the bush (52) and a sliding portion between the bush (52) and the blade (51).

The pair of bushes (52) is formed to have a substantially arcuate or semicircular horizontal cross section. The pair of bushes (52) is swingably held inside the bush groove (53). The pair of bushes (52) has an arc portion (52a) facing the bush groove (53) and a flat portion (52b) facing the blade (51). The pair of bushes (52) performs a swing motion so that the arc portion (52a) makes sliding contact with the bush groove (53), with the center of the bush groove (53) serving as an axial center.

The pair of bushes (52) is arranged in the bush groove (53) so that the flat portions (52b) face each other. As a result, a blade groove (55) is formed between the flat portions (52b) of the pair of bushes (52). The blade groove (55) has a substantially rectangular horizontal cross-section, and the blade (51) is held in the inside thereof so as to be movable forward and backward in the radial direction.

The blade (51) is formed in a rectangular parallelepiped shape or a plate shape extending outward in the radial direction. The proximal end (radially inner end) of the blade (51) is integrally connected to the outer circumferential surface of the piston (44). Here, the piston (44) and the blade (51) may be an integrally formed member, or may be formed by integrally fixing separate members to each other. The distal end (radially outer end) of the blade (51) is located in the back pressure chamber (54). The blade (51) partitions the cylinder chamber (45) into the low-pressure chamber (L) and the high-pressure chamber (H). The low-pressure chamber (L) is a space on the right side of the blade (51) in FIG. 2, and communicates with the suction port (46). The high pressure chamber (H) is a space on the left side of the blade (51) in FIG. 2, and communicates with the discharge port (47).

—Operation of Compressor—

When the electric motor (32) is energized and the drive shaft (35) is driven to rotate, the piston (44) performs an eccentric motion (specifically, a swing motion) in the cylinder chamber (45).

As shown in FIG. 3, in the compression mechanism (40), the outer circumferential surface of the piston (44) makes line contact with the inner circumferential surface of the cylinder chamber (45) via an oil film, thereby forming a seal portion. When the piston (44) performs a swing motion, the seal portion between the piston (44) and the cylinder (42) is displaced along the inner circumferential surface of the cylinder chamber (45), thereby changing the volumes of the low-pressure chamber (L) and the high-pressure chamber (H). At this time, the blade (51) moves forward and backward in the inside of the blade groove (55) in accordance with the rotation angle of the piston (44). At the same time, the pair of bushes (52) swings together with the blade (51) around the axial center of the bush groove (53). Here, the "rotation angle" is an angle in the direction of rotation (the clockwise direction in FIG. 3) of the drive shaft (35) from a reference position 0° at which the piston (44) is closest to the bush groove (53) (so-called top dead center).

When the volume of the low-pressure chamber (L) is gradually increased in accordance with the sliding motion of the piston (44), the low pressure refrigerant is sucked into the low-pressure chamber (L) through the suction pipe (23) and the suction port (46). Then, when the low-pressure chamber (L) is blocked from the suction port (46), the blocked space constitutes the high-pressure chamber (H). Then, when the volume of the high pressure chamber (H) is gradually decreased, the internal pressure of the high pressure chamber (H) increases. When the internal pressure of the high pressure chamber (H) exceeds the internal pressure of the internal space (S), a discharge stroke is performed. Specifically, in the discharge stroke, the discharge valve of the discharge port (47) is opened, and the refrigerant in the high-pressure chamber (H) flows out of the compression mechanism (40) through the discharge port (47). The refrigerant discharged from the discharge port (47) flows into the internal space (S) through the muffler space (49). After the refrigerant in the internal space (S) flows around the electric motor (32), it flows out of the discharge pipe (22) and is sent to the refrigerant circuit (11).

—Refrigerant—

Examples of the refrigerant to fill the refrigerant circuit (11) can include a single refrigerant consisting of a fluorocarbon having a property of causing a disproportionation reaction, and a mixed refrigerant consisting of the fluorocarbon having a property of causing a disproportionation reaction and at least one kind of refrigerant different from the fluorocarbon.

Examples of the fluorocarbon having a property of causing a disproportionation reaction can include a hydrofluoroolefin (HFO) which has a carbon-carbon double bond. The hydrofluoroolefin has little influence on the ozone layer and global warming, and is easily decomposed by OH radicals. Specifically, as such an HFO refrigerant, it is preferable to use trifluoroethylene (HFO-1123) having excellent performance as disclosed in Japanese Unexamined Patent Publication No. 2015-7257 and Japanese Unexamined Patent Publication No. 2016-28119. As an HFO refrigerant other than HFO-1123, any HFO among 3,3,3-trifluoropropene (HFO-1243zf), 1,3,3,3-tetrafluoropropene (HFO-1234ze), 2-fluoropropene (HFO-1261yf), 2,3,3,3-tetrafluoropropene (HFO-1234yf), 1,1,2-trifluoropropene (HFO-1243yc), which are disclosed in Japanese Unexamined Patent Publication No. H04-110388, and 1,2,3,3,3-pentafluoropropene (HFO-1225ye), trans-1,3,3,3-tetrafluoropropene (HFO-1234ze(E)), and cis-1,3,3,3-tetrafluoropropene (HFO-1234ze(Z)), which are disclosed in Japanese Unexamined Patent Publication (Translation of PCT Application) No. 2006-512426, is applicable to the present disclosure as long as it has a property of causing a disproportionation reaction. Examples of the fluorocarbon having a property of causing a disproportionation reaction can include an acetylenic fluorocarbon having a carbon-carbon triple bond.

In a case of using a mixed refrigerant containing a fluorocarbon having a property of causing a disproportionation reaction, it is preferable to include the above-described HFO-1123. For example, a mixed refrigerant consisting of HFO-1123 and HFC-32 can be used. The composition ratio of the mixed refrigerant is preferably, for example, HFO- 1123:HFC-32=40:60 (unit: wt %). Further, it is also possible to use a mixed refrigerant consisting of HFO-1123, HFC-32 and HFO-1234yf. The composition ratio of the mixed refrigerant is preferably, for example, HFO-1123:HFC-32:HFO-1234yf=40:44:16 (unit: wt %). Further, it is possible to use, as a mixed refrigerant, AMOLEA X series (trade name: manufactured by AGC Inc.) and AMOLEAY series (trade name: manufactured by AGC Inc.).

As other refrigerants included in the mixed refrigerant, it is possible to appropriately use other substances, such as hydrocarbon (HC), hydrofluorocarbon (HFC), hydrochlorofluoroolefin (HCFO), and chlorofluoroolefin (CFO), which vaporize and liquefy together with HFO-1123.

The HFC is a component that improves performance, and has little influence on the ozone layer and global warming. It is preferable to use an HFC having five or less carbon atoms. Specifically, as the HFC, it is possible to use, e.g., difluoromethane (HFC-32), difluoroethane (HFC-152a), trifluoroethane (HFC-143), tetrafluoroethane (HFC-134), pentafluoroethane (HFC-125), pentafluoropropane (HFC-245ca), hexafluoropropane (HFC-236fa), heptafluoropropane (HFC-227ea), pentafluorobutane (HFC-365), and heptafluorocyclopentane (HFCP). Among these HFCs, difluoromethane (HFC-32), 1,1-difluoroethane (HFC-152a), 1,1,2,2-tetrafluoroethane (HFC-134), and 1,1,1,2-tetrafluoroethane (HFC-134a) and pentafluoroethane (HFC-125) are particularly preferable since these HFCs have little influence on the ozone layer and the global warming. These HFCs may be used alone or in combination of two or more thereof.

An HCFO is a compound having a carbon-carbon double bond, a large proportion of halogen in the molecule, and reduced combustibility. Examples of the HCFO can include 1-chloro-2,3,3,3-tetrafluoropropene (HCFO-1224yd), 1-chloro-2,2-difluoroethylene (HCFO-1122), 1,2-dichlorofluoroethylene (HCFO-1121), 1-chloro-2-fluoroethylene (HCFO-1131), 2-chloro-3,3,3-trifluoropropene (HCFO-1233xf), and 1-chloro-3,3,3-trifluoropropene (HCFO-1233zd). Among these HCFOs, HCFO-1224yd is preferable since it has particularly excellent performance, and HCFO-1233zd is also preferable since it has a high critical temperature and is excellent in durability and coefficient of performance. HCFOs other than HCFO-1224yd may be used alone or in combination of two or more thereof.

—Controller—

The controller (90) shown in FIG. 1 includes a central processing unit (CPU) and a printed board on which a memory is mounted. The controller (90) controls the compressor (30), the expansion valve (17), the four-way switching valve (19), the outdoor fan (20), the indoor fan (21), and other components based on an operation switching command and a detection signal of respective sensors.

The controller (90) of this embodiment includes a refrigerant temperature estimation unit (91), a coil temperature estimation unit (92), and a high-pressure control unit (93) (control unit).

The refrigerant temperature estimation unit (91) constitutes a refrigerant temperature detection unit which detects a temperature of the refrigerant which is being discharged from the compression mechanism (40) or immediately after the discharge (hereinafter referred to as a "discharged refrigerant temperature Td"). The refrigerant temperature estimation unit (91) of this embodiment calculates the discharged refrigerant temperature Td based on a database (map, approximate expression, data table, and the like) stored in advance, and an operating state of the air conditioner (10).

The database is determined in accordance with, e.g., the type of the refrigerant, and operating conditions.

The coil temperature estimation unit (92) constitutes a coil temperature detection unit which detects the surface temperature (a coil temperature Tm) of the coil (33a) of the electric motor (32). The coil temperature estimation unit (92) of this embodiment estimates the coil temperature Tm based on the resistance value of the coil (33a) of the electric motor (32).

The high-pressure control unit (93) first compares the discharged refrigerant temperature Td estimated by the refrigerant temperature estimation unit (91) with the coil temperature Tm estimated by the coil temperature estimation unit (92). When the discharged refrigerant temperature Td is higher than the coil temperature Tm, the discharged refrigerant temperature Td is considered as a target to be controlled, and is controlled to be equal to or lower than a predetermined temperature (an upper limit temperature Ts). Further, when the coil temperature Tm is higher than the discharged refrigerant temperature Td, the coil temperature Tm is considered as a target to be controlled, and is controlled to be equal to or lower than the upper limit temperature Ts.

—Control for Substantially Preventing Disproportionation Reaction—

More specifically, the controller (90) according to this embodiment performs the following control so that the temperature of the refrigerant on the high-pressure side of the refrigerant circuit (11) does not exceed the temperature at which the disproportionation reaction occurs.

During the operation of the air conditioner (10), an evaporation temperature Te, a condensation temperature Tc, a suction superheat degree K of the refrigerant circuit (11), and a rotational number N of the compressor (30) are detected as parameters indicating the operating state of the air conditioner (10). These parameters are suitably measured by known detection methods. The refrigerant temperature estimation unit (91) obtains the discharged refrigerant temperature (the temperature of the refrigerant at point b in FIG. 4) using these parameters, and, e.g., the map shown in FIG. 4 or an approximate expression.

Specifically, the refrigerant temperature estimation unit (91) obtains a pressure Ps, an enthalpy Ha, and an entropy Sa of the refrigerant (point a in FIG. 4) to be sucked into the compression mechanism (40) Here, the pressure Ps is a saturation pressure corresponding to the evaporation temperature Te. The enthalpy Ha and entropy Sa of the refrigerant at the point a are determined based on the evaporation temperature Te, the superheat degree K, and the pressure Ps.

Then, when adiabatic compression is performed in the compression mechanism (40) (i.e., when the compressor efficiency is 100%), the pressure Pd and the enthalpy Hb' of the refrigerant (point b' in FIG. 4) to be discharged from the compression mechanism (40) are obtained. Here, the pressure Pd is a saturation pressure corresponding to the condensation temperature Tc. The enthalpy Hb' is determined based on the pressure Pd and the entropy Sa.

Figure 4:
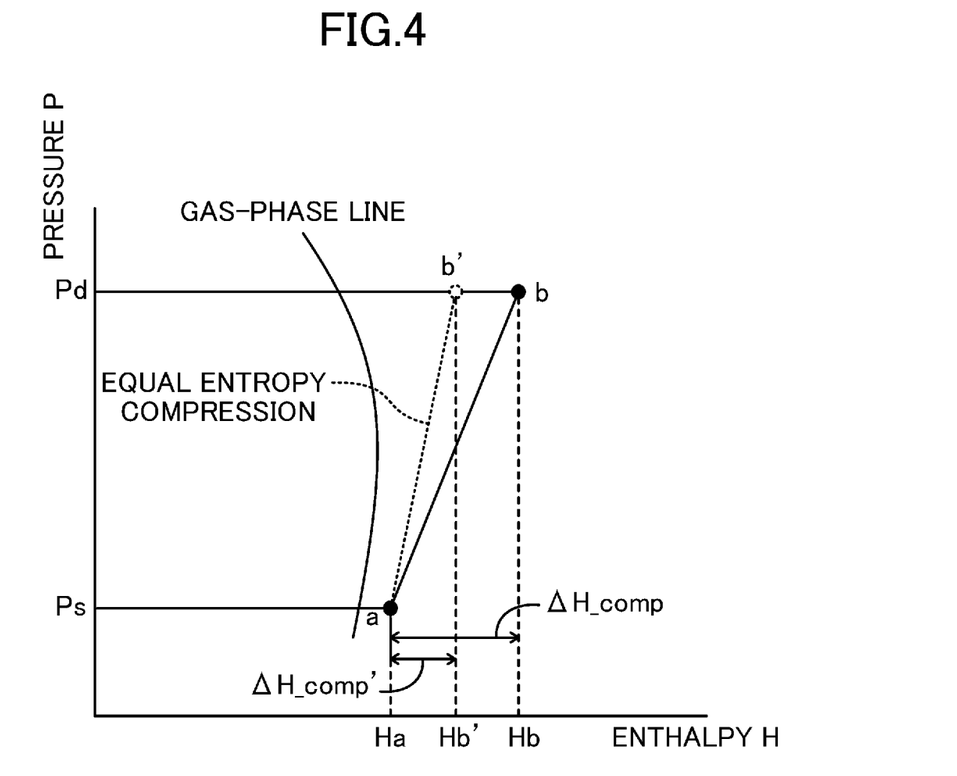
FIG. 4 is a P-H diagram for explaining a method for estimating the temperature of a refrigerant of the refrigeration apparatus according to the embodiment.

An enthalpy difference $\Delta H\_comp'$ corresponding to a compression power when the compressor efficiency is 100% is the difference (Hb'−Ha) between the enthalpy Hb' at the point b' and the enthalpy Ha at the point a On the other hand, an enthalpy difference $\Delta H\_comp$ corresponding to an actual compression power can be determined based on $\Delta H\_comp'/\eta$ in consideration of the compressor efficiency $\eta$. Here, the compressor efficiency $\eta$ can be approximately determined based on the evaporation temperature Te, the condensation temperature Tc, and the rotational number N of the compressor (30). The enthalpy Hb of the refrigerant at the point b can be obtained as Ha+ΔH_comp, and the discharged refrigerant temperature Td at that time can be obtained based on the pressure Pd and the enthalpy Hb.

The compressor efficiency η may be determined in consideration of the superheat degree K in addition to the evaporation temperature Te, the condensation temperature Tc, and the rotational number N of the compressor (30). However, the superheat degree K does not vary significantly due to the known superheat control, and thus, even if the compressor efficiency η is obtained without consideration for the superheat degree K, the detection accuracy of the discharged refrigerant temperature Td is not significantly reduced.

During the operation of the air conditioner (10), the coil temperature Tm of the electric motor (32) is appropriately determined by the coil temperature estimation unit (92). The coil temperature Tm is calculated, for example, based on the following equations (1) and (2).

$$Tm = T_0 + \Delta T \quad (1)$$

$$\Delta T = ((R/R_0) - 1) \times (\alpha + T_0) \quad (2)$$

where $T_0$ is the coil temperature of the electric motor while the operation is stopped, $\Delta T$ is an amount of increase in the coil temperature in accompany with the operation, $R_0$ is a resistance value of the coil of the electric motor while the operation is stopped, R is the resistance value of the coil during the operation, and $\alpha$ is a temperature coefficient of the coil.

The resistance value R of the coil (33a) of the electric motor (32) can be estimated using the operating state (for example, a current value and a voltage value) of the electric motor (32) An error may occur in the calculation result due to the ambient temperature of the compressor (30), the structure of the electric motor (32), the shape of the electric motor (32), and other causes. Therefore, correlations between the resistance value R and the coil temperature Tm which correspond to such error factors may be stored in advance in a database such as a map. Reference is made to the database as appropriate, thereby making it possible to improve estimation accuracy of the coil temperature Tm.

The high-pressure control unit (93) first compares the discharged refrigerant temperature Td estimated by the refrigerant temperature estimation unit (91) with the coil temperature Tm estimated by the coil temperature estimation unit (92). Here, it is assumed that the discharged refrigerant temperature Td is higher than the coil temperature Tm. In this case, even if the refrigerant discharged from the compression mechanism (40) shown in FIG. 2 passes through the vicinity of the electric motor (32), the refrigerant does not receive heat input from the coil (33a) of the electric motor (32), and flows out to the discharge pipe (22). This means that the temperature of the refrigerant which is being discharged from the compression mechanism (40) or immediately after the discharge is highest in the compressor (30). Therefore, when the discharged refrigerant temperature Td is higher than the coil temperature Tm, the high-pressure control unit (93) controls the high pressure of the refrigerant circuit (11) so that the discharged refrigerant temperature Td is equal to or lower than the upper limit temperature Ts. As a result, the temperature of the discharged refrigerant from the compression mechanism (40), though it can be said to be highest in the compressor (30), can be controlled to be equal to or lower than the upper limit temperature Ts. This can substantially prevent the refrigerant from undergoing a disproportionation reaction inside the compressor (30).

Further, it is assumed that the coil temperature Tm estimated by the coil temperature estimation unit (92) is higher than the discharged refrigerant temperature Td. In this case, when the refrigerant discharged from the compression mechanism (40) shown in FIG. 2 passes through the vicinity of the electric motor (32), the refrigerant absorbs heat from the coil (33a). This means that the temperature of the refrigerant around the electric motor (32) is highest in the compressor (30). Therefore, when the coil temperature Tm is higher than the discharged refrigerant temperature Td, the high-pressure control unit (93) controls the high pressure of the refrigerant circuit (11) so that the coil temperature Tm is equal to or lower than the upper limit temperature Ts. As a result, the temperature of the refrigerant around the electric motor (32), though it can be said to be highest in the compressor (30), can be reduced to be equal to or lower than the upper limit temperature Ts. This can substantially prevent the refrigerant from undergoing a disproportionation reaction inside the compressor (30).

Adoptable examples of methods for controlling the high pressure of the refrigerant circuit (11) by the high-pressure control unit (93) include: 1) reducing the rotational number of the compressor (30); 2) increasing the rotational number of the fan corresponding to the condenser (radiator), which is either the outdoor fan (20) or the indoor fan (21); 3) reducing the rotational number of the fan corresponding to the evaporator, which is either the outdoor fan (20) or the indoor fan (21); and 4) increasing the opening degree of the expansion valve (17).

—Advantages of Embodiment—

In the above embodiment, using a refrigerant such as HFO-1123, the influence on the ozone layer and the influence on global warming can be reduced. On the other hand, in a case of using a refrigerant containing a fluorocarbon having a property of causing such a disproportionation reaction, the temperature of the high-pressure refrigerant in the refrigerant circuit (11) may exceed the temperature at which the disproportionation reaction occurs.

In this embodiment, the discharged refrigerant temperature Td that is the temperature of the refrigerant which is being discharged from the compression mechanism (40) or immediately after the discharge is controlled to be equal to or lower than the predetermined temperature Ts. Here, the discharged refrigerant temperature Td tends to be higher than the temperature of the refrigerant flowing through, e.g., the discharge pipe (22). Therefore, the discharged refrigerant temperature Td is controlled to be equal to or lower than the predetermined temperature Ts, thereby substantially preventing, with reliability, the temperature of the refrigerant inside the compressor (30) from exceeding the temperature at which the disproportionation reaction occurs.

In addition, under a condition that the coil temperature Tm is higher than the discharged refrigerant temperature Td, the coil temperature Tm is controlled to be equal to or lower than the predetermined temperature Ts. Thus, for example, under the condition that the temperature of the refrigerant around the electric motor (32) is highest due to heat input from the coil (33a) of the electric motor (32), it is possible to substantially prevent, with reliability, the temperature of the refrigerant from exceeding the temperature at which the disproportionation reaction occurs.

—Variations of Embodiment—

The compressor (30) of the above embodiment may be configured as the following variations.

<First Variation>

Figure 5:
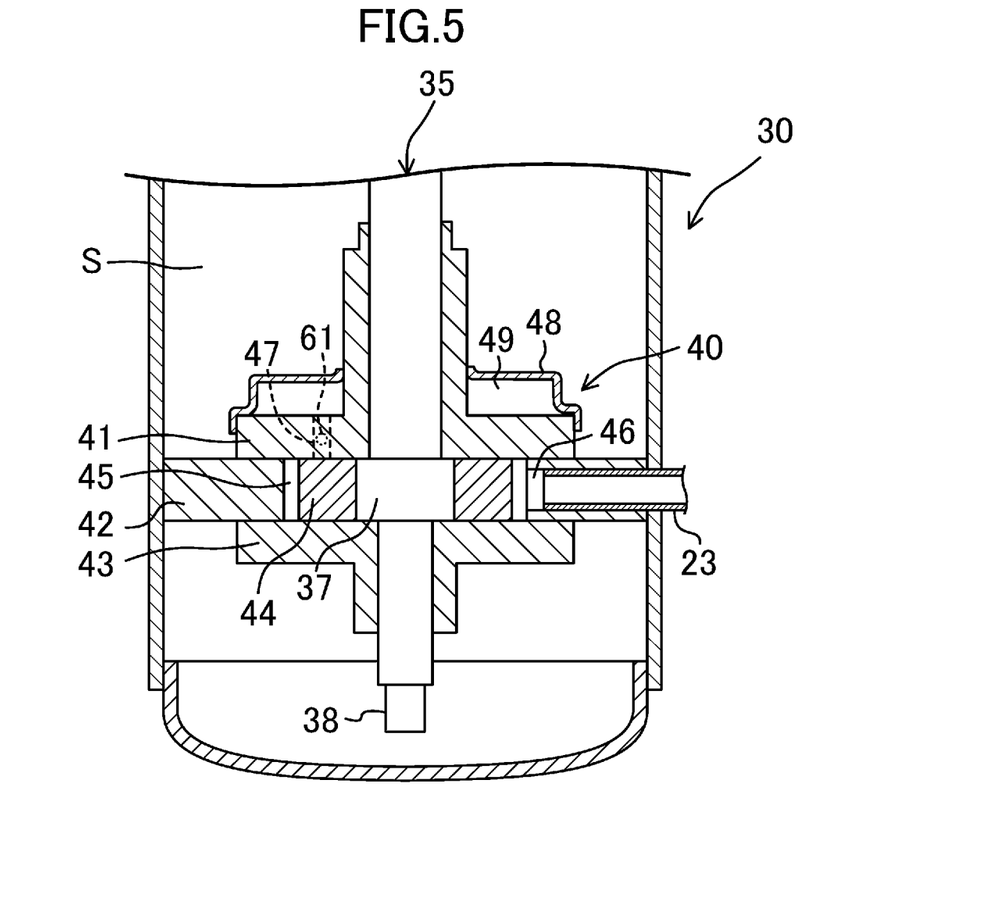
FIG. 5 is a vertical cross-sectional view of a main part of a compressor according to a first variation.

An air conditioner (10) of a first variation is different from that of the above embodiment in the configuration of the refrigerant temperature detection unit. In the first variation, as shown in FIG. 5, the refrigerant temperature detection unit is configured as a temperature sensor (a discharge-port-side temperature sensor (61)). The discharge-port-side temperature sensor (61) is disposed inside the discharge port (47), and directly detects the temperature (the discharged refrigerant temperature Td) of the refrigerant flowing through the discharge port (47).

In the first variation, the temperature of the refrigerant inside the discharge port (47), which temperature tends to be highest in the compressor (30), can be reduced to a predetermined temperature Ts or less. This can substantially prevent the disproportionation reaction of the high-pressure refrigerant with reliability. Other advantages are the same as or similar to those in the above embodiment.

<Second Variation>

Figure 6:
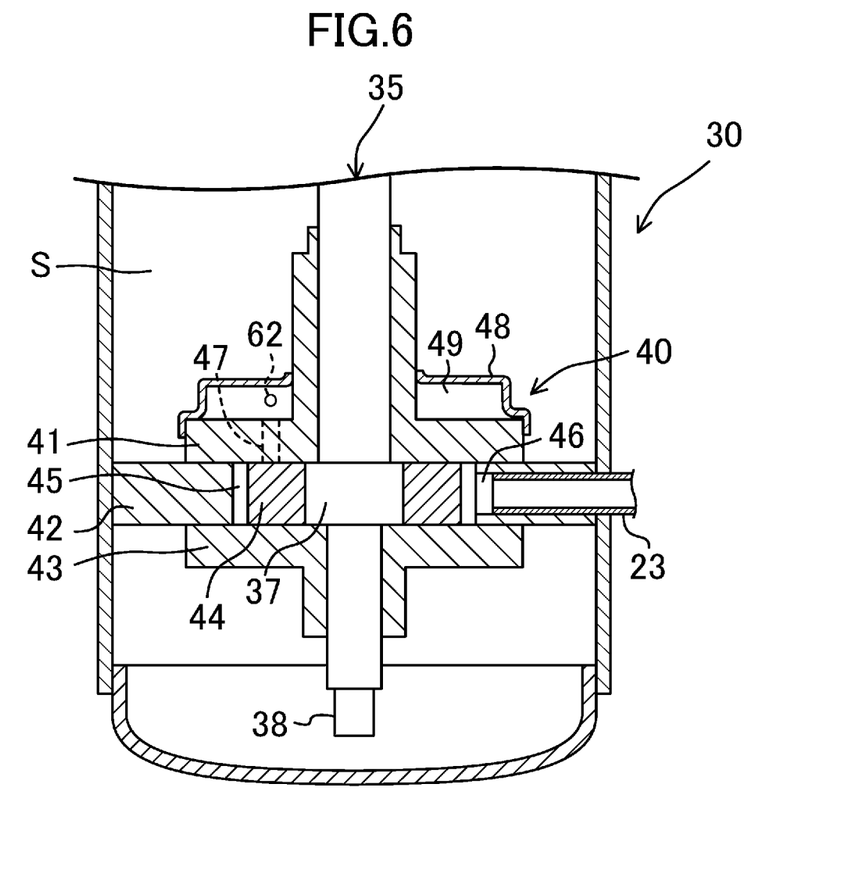
FIG. 6 is a vertical cross-sectional view of a main part of a compressor according to a second variation.

An air conditioner (10) of a second variation is different from that of the above embodiment in the configuration of the refrigerant temperature detection unit. In the second variation, as shown in FIG. 6, the refrigerant temperature detection unit is configured as a temperature sensor (a muffler-side temperature sensor (62)). The muffler-side temperature sensor (62) is disposed in the muffler space (49) in the muffler (48), and directly detects a temperature (the discharged refrigerant temperature Td) of the refrigerant flowing through the muffler space (49). That is to say, the muffler-side temperature sensor (62) detects the temperature of the refrigerant immediately after the refrigerant is discharged from the compression mechanism (40).

In the second variation example, the muffler space (49) inside the muffler (48) can be used as an installation space for the muffler-side temperature sensor (62). Other advantages are the same as or similar to those in the above embodiment.

For example, the muffler (48) may be attached to a portion adjacent to the rear head (43), and the muffler-side temperature sensor (62) may be disposed in the muffler space (49) of the muffler (48).

<Third Variation>

Figure 7:
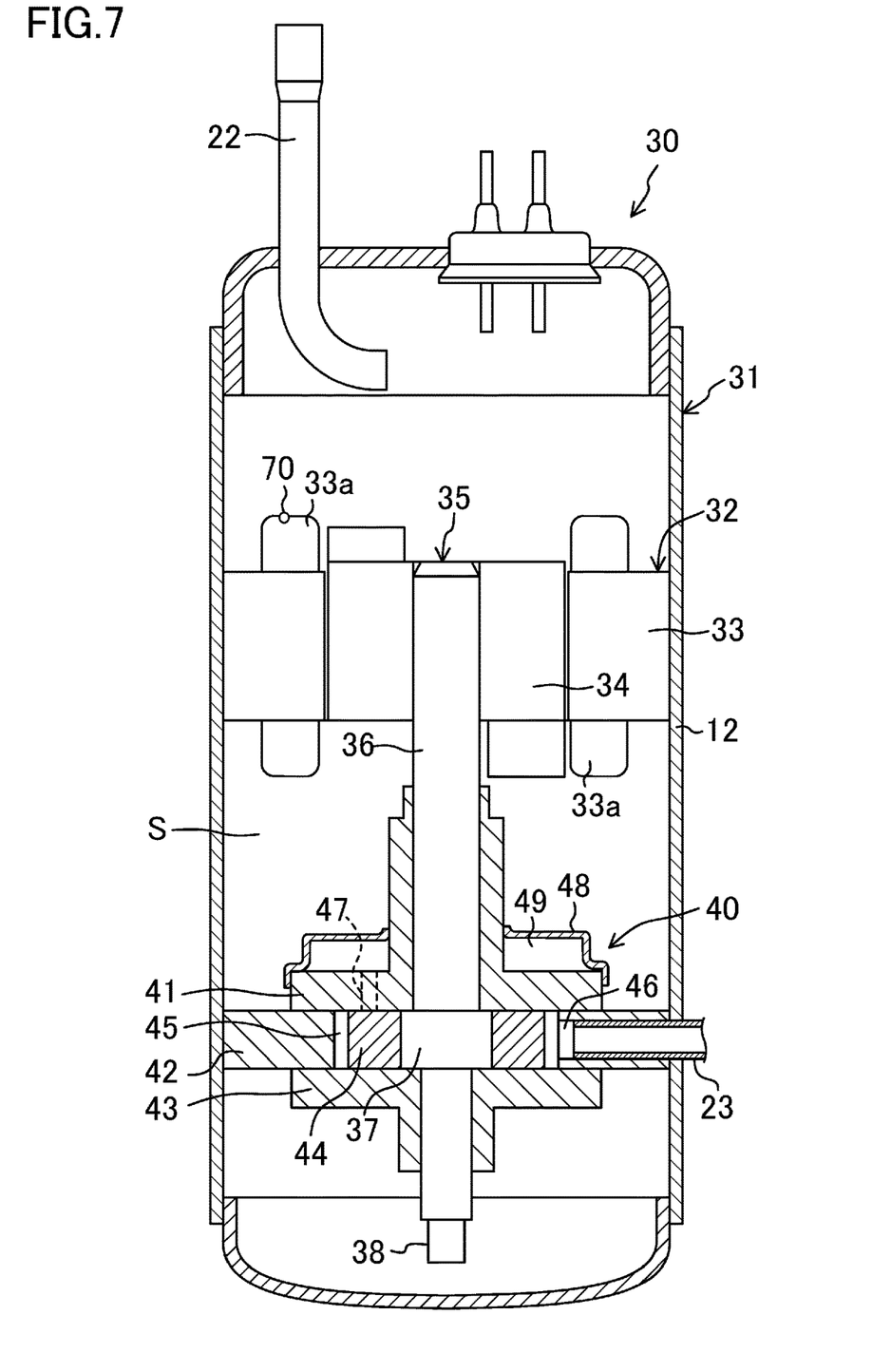
FIG. 7 is a vertical cross-sectional view of a compressor according to a third variation.

An air conditioner (10) of a third variation is different from that of the above embodiment in the configuration of the coil temperature detection unit. In the third variation, as shown in FIG. 7, the coil temperature detection unit is configured as a coil temperature sensor (70). The coil temperature sensor (70) is provided at a position in contact with the coil (33a) of the electric motor (32). The coil temperature sensor (70) is disposed in a downstream portion of the refrigerant flow in the electric motor (32) (see, for example, FIG. 7). The coil temperature sensor (70) may be disposed in an upstream portion of the refrigerant flow in the electric motor (32), or may be disposed in an intermediate portion of the refrigerant flow in the electric motor (32).

In the third variation, the coil temperature sensor (70) directly detects the coil temperature Tm, thereby improving the accuracy in detecting the coil temperature Tm. Other advantages are the same as or similar to those in the above embodiment.

Other Embodiments

The above embodiment and each variation may be configured as follows.

In the above embodiment, the temperature of the high-pressure refrigerant is controlled using the discharged refrigerant temperature Td and the coil temperature Tm. However, only the discharged refrigerant temperature Td may be used. That is to say, the high-pressure control unit (93) may always control the discharged refrigerant temperature Td to be equal to or lower than the predetermined temperature Ts.

The refrigeration apparatus of the above embodiment is an air conditioner (10) for cooling and heating a room. However, any refrigeration apparatus may be adopted as long as it is provided with a refrigerant circuit and performs a refrigeration cycle. For example, a cooling and refrigeration apparatus for cooling an interior of a refrigerator, a chiller unit, and a water heater may be adopted as the refrigeration apparatus of the present disclosure.

The compressor (30) of the above embodiment is an oscillating piston compressor. However, various compressors such as a rotary type compressor, a scroll compressor, and a screw compressor may be used in the present disclosure. For example, if a screw compressor is used, temperature sensors may be disposed in a path of a refrigerant from a fixed scroll to a discharge pipe and in a chamber, and it is possible to detect the temperature of the refrigerant which is being discharged from the compression mechanism or immediately after the discharge.

Further, the compression mechanism (40) may be a so-called two-cylinder compression mechanism in which a refrigerant is compressed by a plurality of compression sections, or a multistage compression mechanism in which a plurality of compression sections are connected in series and the refrigerant is compressed in multiple stages.

Each of the configurations described in the above embodiments and variations may be combined as appropriate.

As described above, the present disclosure is useful for a refrigeration apparatus.

What is claimed is:

1. A refrigeration apparatus comprising a refrigerant circuit to which a compressor for compressing a refrigerant is connected, wherein the refrigerant contains a fluorocarbon having a property of causing a disproportionation reaction, the compressor includes:
 a casing;
 an electric motor housed in the casing;
 a compression mechanism driven by the electric motor and configured to discharge the refrigerant, which has been compressed, into an internal space of the casing; and
 a discharge pipe configured to send the refrigerant in the internal space to the refrigerant circuit, and the refrigeration apparatus includes:
 a refrigerant temperature detector configured to detect a discharged refrigerant temperature which is a temperature of the refrigerant that is being discharged from the compression mechanism or immediately after the discharge, and is a temperature of the refrigerant before the refrigerant passes through the electric motor; and
 a controller configured to control the discharged refrigerant temperature detected by the refrigerant temperature detector such that the discharged refrigerant temperature is equal to or lower than a predetermined temperature Ts, the electric motor is disposed in the internal space of the casing, the refrigeration apparatus includes a coil temperature detector configured to detect a coil temperature of the electric motor, and the controller
 controls the discharged refrigerant temperature such that the discharged refrigerant temperature is equal to or lower than the predetermined temperature Ts if the discharged refrigerant temperature is higher than the coil temperature; and controls the coil temperature such that the coil temperature is equal to or lower than the predetermined temperature Ts if the coil temperature is higher than the discharged refrigerant temperature.

2. The refrigeration apparatus of claim 1, wherein the refrigerant temperature detector is configured to estimate the discharged refrigerant temperature based on an operating state of the refrigerant circuit.

3. The refrigeration apparatus of claim 1, wherein the refrigerant temperature detector is a discharge-port-side temperature sensor provided in a discharge port of the compression mechanism.

4. The refrigeration apparatus of claim 1, further comprising a muffler through which the refrigerant immediately after the discharge from the compression mechanism passes, wherein the refrigerant temperature detector is a muffler-side temperature sensor provided inside the muffler.

5. The refrigeration apparatus of claim 1, wherein the refrigerant is a refrigerant containing HFO-1123.

6. The refrigeration apparatus of claim 2, further comprising a muffler through which the refrigerant immediately after the discharge from the compression mechanism passes, wherein the refrigerant temperature detector is a muffler-side temperature sensor provided inside the muffler.

7. The refrigeration apparatus of claim 3, further comprising a muffler through which the refrigerant immediately after the discharge from the compression mechanism passes, wherein the refrigerant temperature detector is a muffler-side temperature sensor provided inside the muffler.

8. The refrigeration apparatus of claim 2, wherein the refrigerant is a refrigerant containing HFO-1123.

9. The refrigeration apparatus of claim 3, wherein the refrigerant is a refrigerant containing HFO-1123.

10. The refrigeration apparatus of claim 4, wherein the refrigerant is a refrigerant containing HFO-1123.

* * * * *